US009255465B2

(12) United States Patent
Smith, IV et al.

(10) Patent No.: US 9,255,465 B2
(45) Date of Patent: Feb. 9, 2016

(54) METHOD FOR AUTONOMOUS CONTROL OF A CHEMICAL INJECTION SYSTEM FOR OIL AND GAS WELLS

(75) Inventors: Robert E. Smith, IV, Sugarland, TX (US); Maurice Slot, Nichols Hills, OK (US); Richard R. Watson, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 2045 days.

(21) Appl. No.: 11/934,513

(22) Filed: Nov. 2, 2007

(65) Prior Publication Data

US 2009/0114391 A1  May 7, 2009

(51) Int. Cl.
*G05D 7/06* (2006.01)
*E21B 37/06* (2006.01)
*E21B 41/02* (2006.01)

(52) U.S. Cl.
CPC ........... *E21B 37/06* (2013.01); *E21B 41/02* (2013.01); *G05D 7/0635* (2013.01); *Y10T 137/0368* (2015.04); *Y10T 137/0379* (2015.04); *Y10T 137/776* (2015.04); *Y10T 137/7759* (2015.04); *Y10T 137/7761* (2015.04)

(58) Field of Classification Search
CPC ... E21B 37/06; E21B 41/02; Y10T 137/0368; Y10T 137/776; Y10T 137/0379; Y10T 137/7759; Y10T 137/7761; G05D 7/0635
USPC .......................................... 137/10, 486, 487.5
See application file for complete search history.

(56) References Cited

U.S. PATENT DOCUMENTS

| | | | |
|---|---|---|---|
| 2,536,184 A * | 1/1951 | Johnson | 91/387 |
| 4,796,651 A * | 1/1989 | Ginn et al. | 137/8 |
| 5,193,990 A | 3/1993 | Kamen et al. | |
| 5,329,966 A * | 7/1994 | Fenimore et al. | 137/613 |
| 5,950,668 A * | 9/1999 | Baumann | 137/487.5 |
| 6,026,847 A | 2/2000 | Reinicke et al. | |
| 6,973,936 B2 | 12/2005 | Watson | |
| 7,100,631 B2 * | 9/2006 | Liu et al. | 137/208 |
| 8,327,875 B2 | 12/2012 | Grace et al. | |
| 2006/0102355 A1 | 5/2006 | Ayres | |
| 2006/0278276 A1 * | 12/2006 | Tanaka et al. | 137/487.5 |
| 2012/0325488 A1 | 12/2012 | Grace et al. | |

FOREIGN PATENT DOCUMENTS

GB     2 391 859 A     2/2004

OTHER PUBLICATIONS

Combined Search and Examination Report dated Dec. 1, 2008 received in corresponding application No. GB0815747.1.
Further Search Report dated Feb. 26, 2009 received in corresponding application No. GB0815747.1.

* cited by examiner

*Primary Examiner* — William McCalister
(74) *Attorney, Agent, or Firm* — Blank Rome LLP

(57) ABSTRACT

A control program for a positive displacement metering system measures the time required for the travel of a free piston in a cylinder of known volume to determine an average flow rate during a full stroke of the piston. The system may also measure and record the inlet and outlet pressures or the differential pressure between the fluid inlet and outlet. The control program positions a four-way valve which may function as an adjustable metering orifice in response to the measured average flow rate and/or changes in the inlet and outlet pressures to achieve the desired flow rate. At the end of each stroke, the four-way valve is repositioned to reverse fluid flow through the metering cylinder. The system may revise the valve position settings for both forward and reverse strokes based on the measured time required for a full stroke at a certain valve position. In this way, the system automatically and iteratively compensates for changes in fluid properties and fluid pressure. A cleaning cycle which progressively opens the valve stepwise and may culminate in full open valve travel in both fluid flow directions is provided in the event of an obstruction of the valve orifice.

17 Claims, 13 Drawing Sheets

METHOD FOR AUTONOMOUS CONTROL OF A CHEMICAL INJECTION SYSTEM FOR OIL AND GAS WELLS

CROSS-REFERENCE TO RELATED APPLICATIONS

NONE

STATEMENT REGARDING FEDERALLY SPONSORED RESEARCH OR DEVELOPMENT

NONE

BACKGROUND OF THE INVENTION

1. Field of the Invention

This invention relates to chemical injection systems for oil and gas wells. More particularly, it relates to autonomous control systems for injecting liquid phase chemical treatment agents into undersea wells.

2. Description of the Related Art Including Information Disclosed Under 37 CFR 1.97 and 1.98.

A variety of chemical agents are injected into hydrocarbon wells for the control of corrosion, hydrates, asphaltenes, paraffins, scale and the like. These chemical agents are typically in the liquid phase and are pumped into the well at a selected rate using a chemical injection system. For undersea wells, the chemical supply and pump may be located on a production platform and are commonly connected to the wellhead via an umbilical line. If metering of the chemical agent is performed only at the surface, any leak in the umbilical or its connectors will give an erroneous indication of the quantity of chemical agent being injected into the well. Moreover, each subsea well may require its own injection system on the platform and connecting umbilical line.

Certain metering systems of the prior art employ a variable orifice—an adjustable orifice that allows remote control of flow at each well. Other metering systems of the prior art rely on pressure-compensated flow control—an adjustable pressure regulator and a fixed orifice can maintain a constant flow at each well.

Metering flow over a large range is often necessary over the life of the well. Orifice metering is limited in range and subject to filming, clogging and differing fluid properties.

Particulate contamination in long chemical injection lines is unavoidable and can clog the small orifices needed for metering and control. Filters on the lines are an added complication affecting system reliability, increasing capital costs and requiring periodic service (which increases operating costs).

U.S. Pat. No. 6,973,936 to Richard R. Watson discloses a fluid injection system that controls the distribution of fluid from a supply line to a selected well at an adjustable rate. A free piston divides a cylinder into first and second chambers. A multi-position valve comprises a first position for passing fluid from the supply line into the first chamber to displace fluid from the second chamber back through the valve to an injection point, and a second position for passing fluid from the supply line to the second chamber to displace fluid from the first chamber back through the valve to the injection point. A control system in communication with a position sensor times displacement of the free piston to selected positions, and selectively adjusts a variable valve opening to adjust flow rate, switch between the first and second positions, and periodically increase the valve opening for cleaning.

BRIEF SUMMARY OF THE INVENTION

The present invention may be embodied in a control program for a positive displacement fluid metering system that measures the time required for the travel of a free piston in a cylinder of known volume to determine an average flow rate during a full stroke of the piston. The system may also measure and record the inlet and outlet pressures or the differential pressure between the fluid inlet and outlet. The controller may take flow rate commands from a client subsea control pod and set the rate of flow by partially opening a four-way valve each time the valve is reversed.

The control program precisely positions a four-way valve which may function as an adjustable metering orifice in response to the measured average flow rate and/or changes in the inlet and outlet pressures to achieve the desired flow rate. At the completion of each stroke, the four-way valve is repositioned to reverse the flow of fluid through the metering cylinder.

The system may revise stored valve position settings for both forward and reverse strokes based on the measured time required for a full stroke at the currently stored valve position. In this way, the system iteratively compensates for any changes in fluid properties and fluid pressure. Certain embodiments of the invention additionally comprise an optional cleaning cycle which progressively opens the valve stepwise and may, if necessary, fully open the valve in both fluid flow directions in order to clear an obstruction of the valve orifice. It has been found that shear seal or gate type valve construction is the design best suited for reliable operation when high pressure fluids are contaminated with hard particulate matter. The standard operating procedure for clearing a blocked valve of this type is to move it to the fully opened and fully closed positions. This allows the accumulated particulates to pass and the seal elements to sweep away or shear any remaining obstructions. By employing this valve construction for the two-position four-way control valve and by controlling the valve actuator in response to the cylinder stroke time, precise flow control with excellent contamination resistance results.

The actuation of the two-position four-way control valve may be accomplished with a conventional stepper motor which drives a ball screw to convert rotation to linear motion. This combination has been found to give very high precision to the linear position of the valve. This precision allows the valve to be partially opened thus creating a precision orifice each time the valve is shifted.

As the valve is shifted to admit flow to first one then the other side of the cylinder piston, flow rate is regulated by the precision orifice created by the partially opened valve. In certain embodiments, a dwell time after the cylinder piston has completed its travel and flow has stopped is included. This provides precise control of the volume of chemical injected into the oil or gas well production stream in a certain period of time.

A system according to the invention may be designed to accommodate all current chemicals used for the control of corrosion, hydrates, asphaltenes, paraffins, and scale in hydrocarbon wells. Viscosity or density changes of the fluid do not require recalibration of the positive displacement metering system. Verification data can be sent to the client subsea control pod.

Using a plurality of systems according to the invention can provide treatment chemical flow assurance for multiple subsea wells from a single umbilical.

BRIEF DESCRIPTION OF THE SEVERAL VIEWS OF THE DRAWING(S)

DETAILED DESCRIPTION OF THE INVENTION

Figure 1:
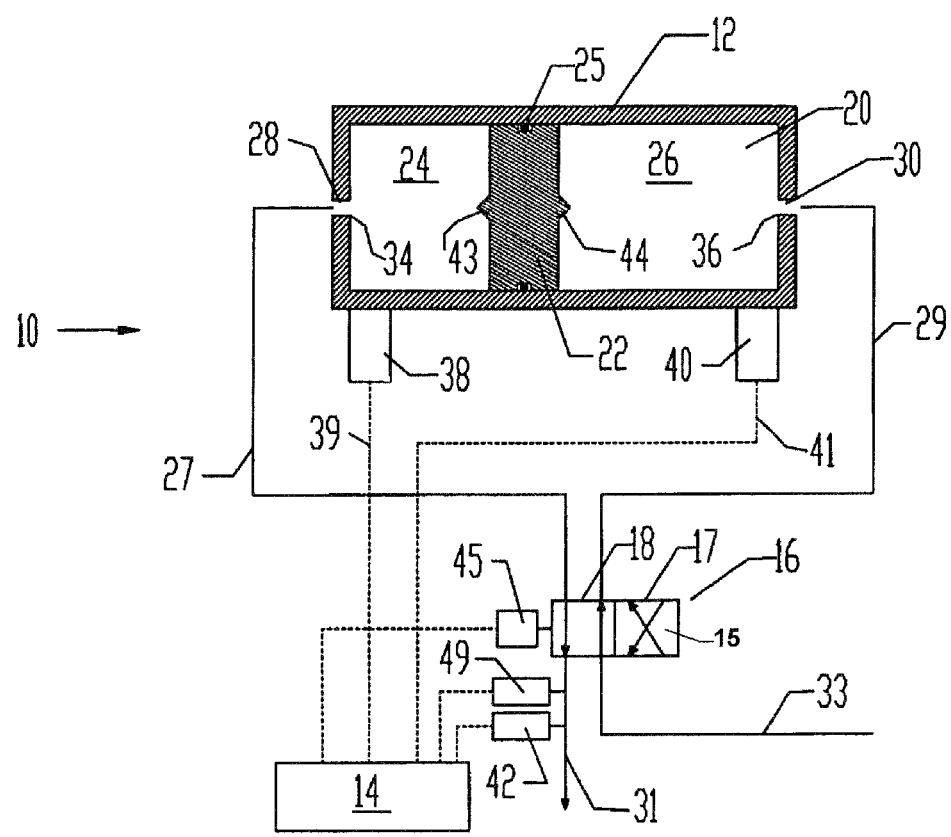
FIG. 1 is a schematic diagram of a chemical injection apparatus of the prior art which may be controlled by the method of the present invention.

FIG. 1 schematically illustrates details of a metering body 12 interconnected with a control system 14 and a multi-position valve 16 driven by actuator 45 in a chemical injection system 10. The metering body 12 has a bore 20 for containing chemical fluid to be delivered to a well. An axially movable free piston 22 in bore 20 divides metering body 12 into variable-volume first and second chambers 24, 26. Free piston 22 seals with metering body 12 with a sealing member such as O-ring 25. Metering body 12 and free piston 22 conventionally comprise a cylinder and piston assembly, as shown. First and second input-output ports 28, 30 are provided for passing fluid into and out of first and second chambers 24, 26. Supply line 33 supplies chemical fluids at high pressure through multi-position valve 16 to metering body 12.

In a first valve position shown in FIG. 1, illustrated conceptually by alignment of parallel line segments 18 with lines 31 and 33, fluid passes from supply line 33, through multi-position valve 16, line 29, and input-output port 30, and into chamber 26. As fluid passes into chamber 26, fluid pressure urges free piston 22 toward end 34 of metering body 12, decreasing the volume of first chamber 24 and displacing the fluid out through input-output port 28. Fluid exiting port 28 passes through line 27, back through valve 16, and out through line 31 to an injection point in the well.

In a second position (not shown), which may be visualized conceptually by sliding the crossed flow lines 15 in valve 16 to the left to align with lines 31 and 33, fluid passes from supply line 33, through multi-position valve 16, line 27, input-output port 28, and into chamber 24. As fluid passes into chamber 24, fluid pressure urges free piston 26 toward end 36 of metering body 12, decreasing the volume of chamber 26 and displacing the fluid out through input-output port 30. Fluid exiting port 30 passes through line 29, back through valve 16, and out through line 31 to the same injection point in the well. Thus, by repeatedly reversing the direction of multi-function valve 16 after free piston 22 has reached a selected position, the fluid may be continually passed from line 33 to line 31 to the injection point in the well.

Position sensors 38 and 40 are included for sensing the position of free piston 22. Position sensors 38, 40 are in communication with control system 14 as represented by dashed lines 39, 41 through conventional means, such as by wire, optical fiber or wireless signal. When free piston 22 reaches selected positions, position sensors 38, 40 signal control system 14, in response to which control system 14 may selectively reverse the position of multi-position valve 16 to reverse the direction of travel of free piston 22.

Because the selected positions are known, relative displacement of free piston 22 is also known, corresponding to a known volumetric displacement of fluid from metering body 12, computed as the product of displacement of free piston 22 and cross-sectional area of bore 20. The control system 14 includes an internal timer for timing displacement of free piston 22 between the selected positions, as signaled by position sensors 38, 40. A volumetric flow rate is therefore also known, which may be computed as the volumetric displacement divided by displacement time. The multi-position valve 16 includes a variable valve opening discussed below in conjunction with FIGS. 2-4, for controlling flow between supply line 33 and metering body 12. The control system 14 selectively adjusts the variable valve opening in response to displacement time of free piston 22. If the displacement time is too long, indicating a flow rate less than a desired flow rate, control system 14 may increase the variable valve opening to increase the flow rate. Conversely, if the displacement time is too short, indicating a flow rate more than the desired flow rate, control system 14 may selectively decrease the valve opening to reduce the flow rate. The flow rate of the fluid delivery to the well is thereby controlled.

As shown in FIG. 1, the selected positions of free piston 22 are preferably the positions of free piston 22 having reached either end 34, 36 of metering body 12. The selected positions of free piston 22 could alternatively be anywhere along the range of travel of free piston 22, and need not be at ends 34, 36 of metering body 12. In typical embodiments, as illustrated, position sensors 38, 40 are at substantially the same axial position as the selected positions. Conventional position sensors such as spring-loaded pins or magnetic or infrared proximity sensors may be used. In other embodiments, the position sensors conceivably may not need to be axially aligned with the selected positions. A position sensor may further comprise an optional pressure transducer 49 or a flow transducer 42. These types of position sensors may sense position implicitly, such as when there is a sudden drop of pressure in line 31 as the free piston reaches ends 34, 36 of metering body 12. Optional port valves such as might comprise sealing members 43, 44 on free piston 22 may be included for sealing input-output ports 28, 30 when free piston reaches ends 34, 36. This may more dramatically decrease pressure in line 31, and thereby provide a more distinct indication that free piston 22 has reached the end of its travel. Such an indication may provide a backup to confirm or substitute for position sensors 38 and 40.

Figure 2:
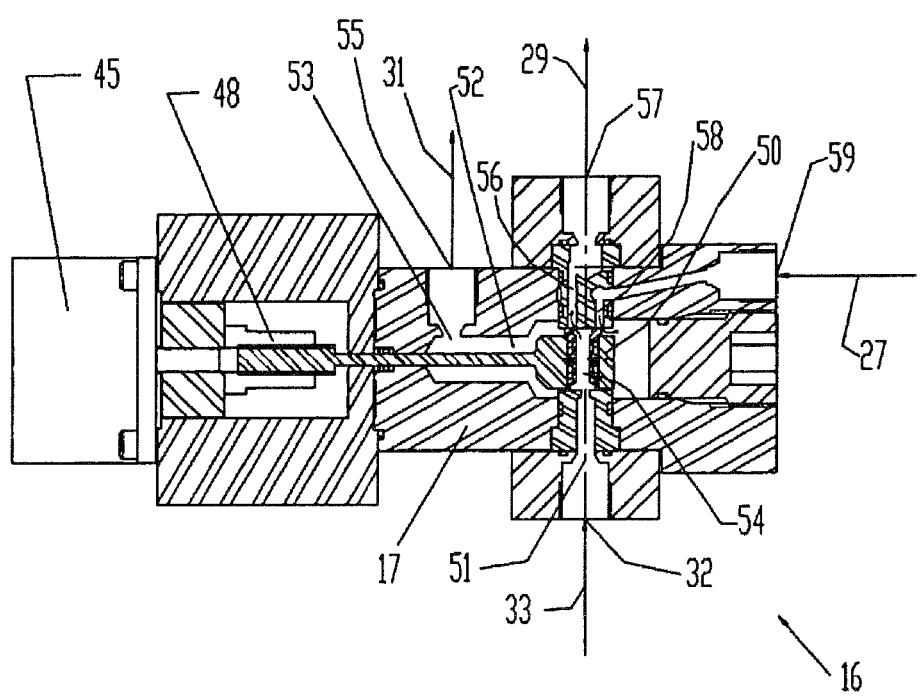
FIG. 2 is a cross-sectional view of the control valve used in the apparatus of FIG. 1 in a first position.
Figure 3:
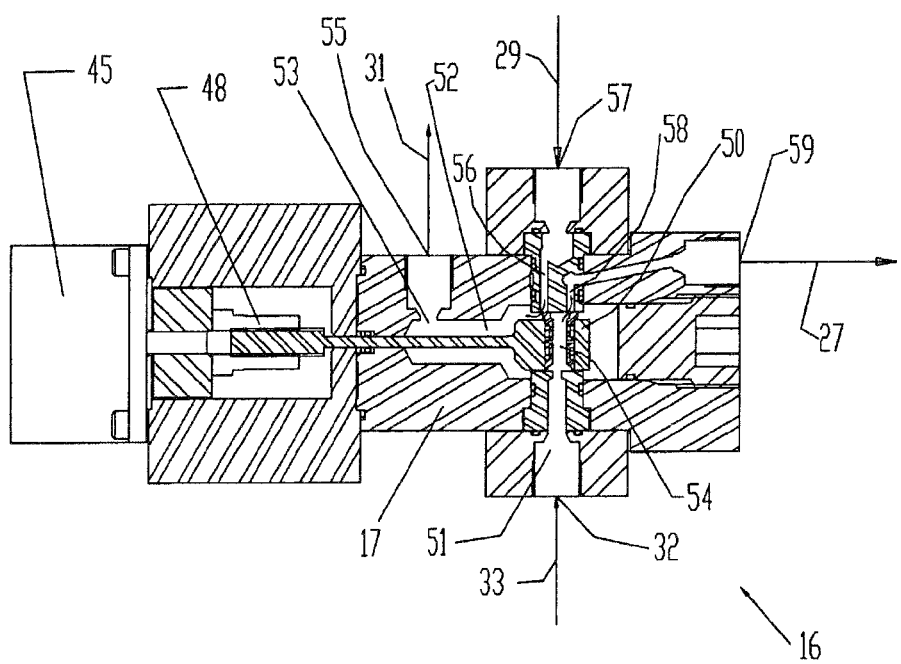
FIG. 3 is a cross-sectional view of the control valve shown in FIG. 2 in a second position.
Figure 4:
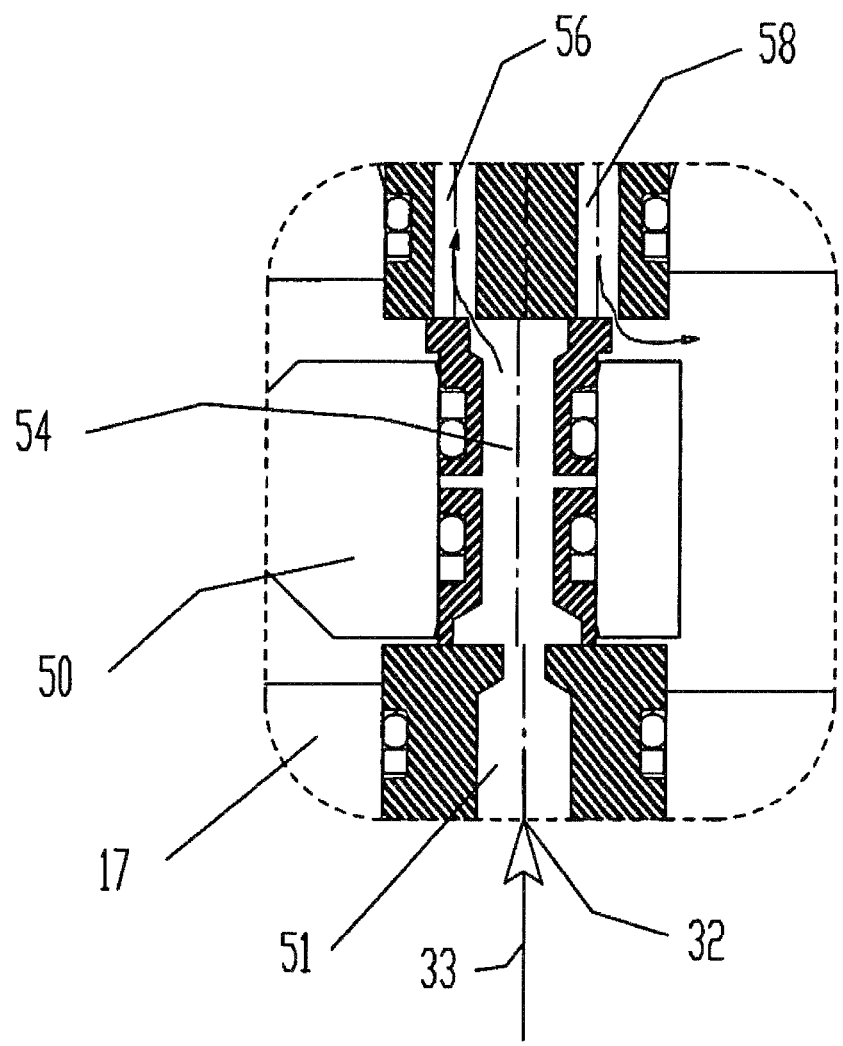
FIG. 4 is an enlarged, cross-sectional view of a portion of the valve shown in FIG. 2.

The terms "first position" and "second position" in connection with valve 16 refer generally to the resulting direction of flow, rather than a fixed position of components of valve 16, because there is generally a degree of adjustability in each of the two positions, such as to adjust flow rate. FIG. 2 shows a detailed view of the preferred embodiment of the multi-position valve 16 in the first valve position, partially open to limit flow through the valve. FIG. 3 shows a detailed view of preferred valve 16 in the second valve position, also partially open. FIG. 4 shows in closer detail a portion of gate-type valve 16 in the first valve position of FIG. 2.

Referring particularly to FIG. 2, the schematic of FIG. 1, and the closer view of FIG. 4, the multi-position valve is indicated generally at 16, having a body 17. A gate 50 is positioned within a cavity 52 in body 17. The gate 50 has a bore 54, which in the position shown is in communication with an entrance port 32 and with a first flow passage 56 extending through body 17 to a first exchange port 57. Thus, in this position, chemical fluid supplied by supply line 33 discussed above flows into body 17 through entrance port 32, through gate bore 54, and through first flow passage 56, exiting through first exchange port 57 to line 29. As described above, fluid passes through line 29 into metering body 12, and other fluid passes from metering body 12 through line 27 back to valve 16. Flow then passes back into body 17 through second exchange port 59, into a second flow passage 58, passes around gate 50, into an exit passage 53, and out through an exit port 55. Flow out through exit port 55 finally passes through line 31 to the injection point in the well, as described above.

In FIG. 3, gate bore 54 is instead positioned in communication with entrance port 32 and with second flow passage 58. Thus, flow from line 33 passes through entrance port 32 into entrance passage 51, through gate bore 54, and through second flow passage 58, exiting through second exchange port 59 to line 27. As described above, fluid passes through line 27 into metering body 12, and other fluid passes from metering body 12 through line 29 back to valve 16. Flow then passes back into body 17 through first exchange port 57, into first flow passage 56, into exit passage 53, and out through exit port 55. Flow out through exit port 55 finally passes through line 31 to the injection point in the well. Thus, as described in connection with FIG. 1, flow between valve 16 and metering body 12 may be reversed by moving the valve between the first and second valve positions shown respectively in FIG. 2 and FIG. 3, but in each case the net flow is from line 33 to line 31 to the injection point in the well.

In the embodiment shown in FIGS. 2-4, stepper motor 45 drives a ball screw 48 to axially move gate 50 within cavity 52, adjusting the size of the flow path defined between gate bore 54 and first flow passage 56, thereby adjusting flow to a desired flow rate. The gate 50 can be moved axially to change between the first valve position of FIG. 2 and the second valve position of FIG. 3. Those skilled in the art will recognize alternative means for moving the gate, other than stepper motor 45.

Hall effect devices used in motion sensing and motion limit switches can offer enhanced reliability in extreme environments. As there are no moving parts involved within the sensor or magnet, typical life expectancy is improved compared to traditional electromechanical switches. Additionally, the sensor and magnet may be encapsulated in an appropriate protective material. Hall effect devices when appropriately packaged are immune to dust, dirt, mud, and water. These characteristics make Hall effect devices particularly preferred in a system according to the present invention for piston position sensing compared to alternative means such as optical and electromechanical sensing.

Controlling flow to a few gallons per day at pressure drop of several hundred pounds per square inch requires a very small orifice of just a few thousandths of an inch. The valve used in one particular preferred embodiment of the invention is a gate type shearing seal valve with a 2880:1 turndown ratio. This valve provides the required small orifice and reverses flow for each positive displacement charge so that clogging is avoided.

Certain systems of the prior art have used filters to avoid particulate clogging of small flow-control orifices but these filters typically need to be serviced subsea which is highly costly. Devices of the prior art have also used capillary orifices which are larger in area for a given restriction to flow and these can be made to adjust their bore diameter by means of a tapered mating screw thread so flow rates can be changed and a temporary larger opening can be used to provide cleaning of contamination. With each of these solutions, metering over a wide range of flow rates is a separate necessary task that requires expensive flow instrumentation; flow cannot be accurately measured by the pressure loss across an orifice of unknown restriction as is the situation with partial particulate clogging. The present invention may include means for creating the small metering orifice with a 4-way gate type valve that is constantly shifted to avoid clogging and may also be opened fully to allow particulate to pass. In addition, the system provides very accurate metering of the flow that is immune to partial clogging or change in fluid properties or filming of the orifice—all conditions which are present and can defeat conventional meters that rely on a pressure drop across an orifice.

The pressure transducers 49 and 49' can provide the controller more information with which to establish the degree of valve opening, but they cannot measure or verify the flow rate. Measurement and verification of the flow rate is provided by the timing circuits and position sensors on the positive displacement cylinder.

If the displacement cylinder fails to stroke in the expected time, a condition that indicates clogging, the controller can drive the 4-way valve to the full open position to allow debris to pass.

An orifice cannot be used as a reliable, subsea, flow-measuring device because it is subject to clogging and filming (coating) by the chemicals which pass through it. The chemicals which are metered in a chemical injection system for a hydrocarbon well may have filming characteristics as a desired trait. Common flow-measuring devices of the prior art use a measurement of pressure loss across an orifice to indicate flow. If an inexpensive pressure drop metering system cannot be used, the conventional alternatives are expensive. Additionally, no other metering device such as turbine, ultrasonic, vortex, or mass thermal type can match the range of a displacement cylinder according to the present invention; they all are limited to 100:1 to 200:1 total range. That means they can accurately measure 1 gallon per day (GPD) up to about 200 GPD. A system according to the present invention can measure 1 GPD up to over 3000 GPD. Also, many well treatment chemicals are non-Newtonian fluids—i.e., their viscosity changes with pressure in a nonlinear fashion, a characteristic that makes accurate flow measurement more challenging for most measurement technology of the prior art but has no effect on a system that employs a positive displacement cylinder.

Referring now to FIG. 6, one particular preferred embodiment of the invention is disclosed in the form of a flowchart which represents certain steps in a method for controlling a valve in a chemical injection system. The chemical injection system may comprise a processor and the method may be implemented as instructions for the processor which may be stored in a storage medium.

Figure 6A:
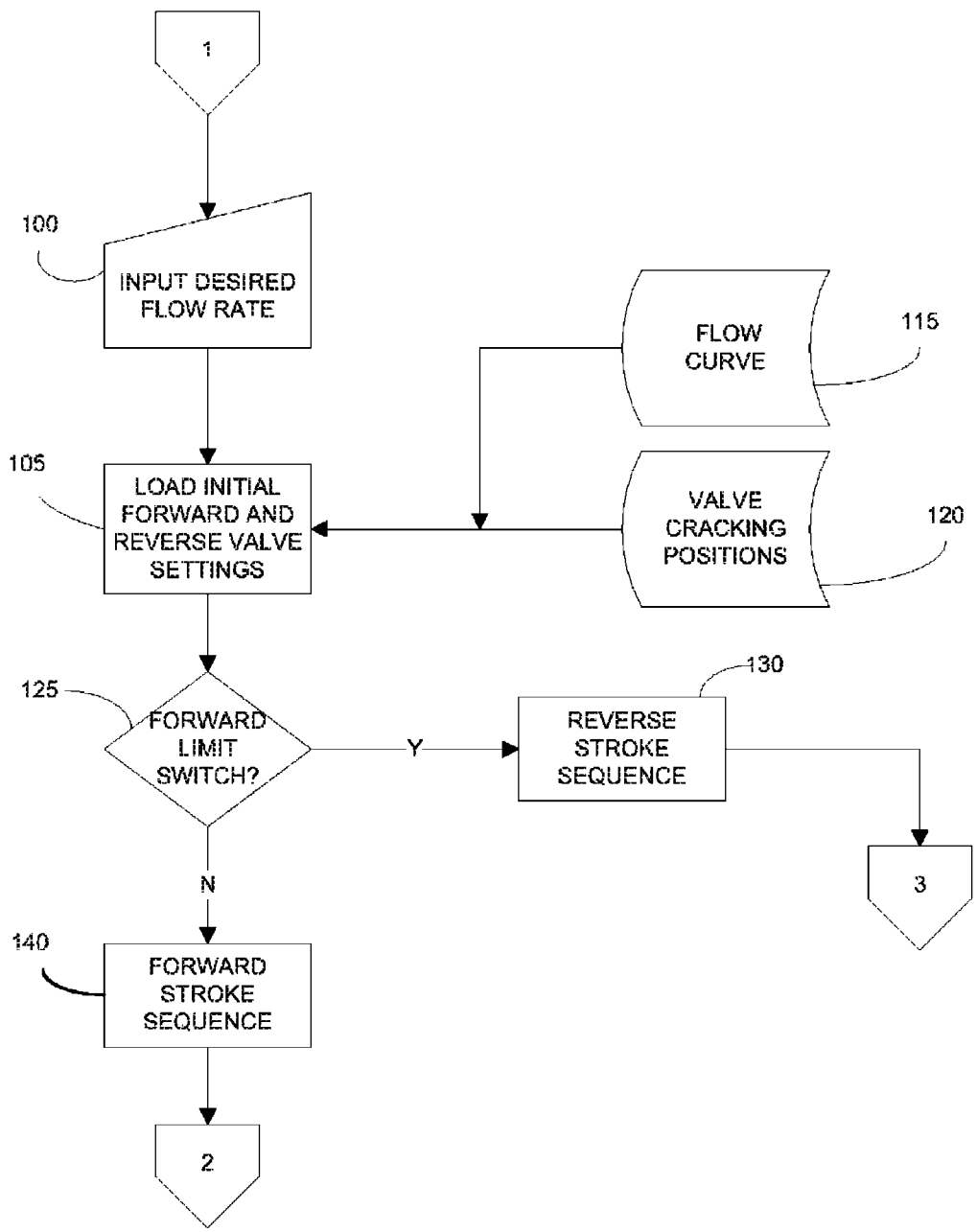
FIG. 6 is a flowchart depicting the steps of a method according to one embodiment of the invention.

As depicted in FIG. 6A, the process may begin at manual input 100 with an operator inputting the desired flow rate of the chemical to be injected. The flow rate may have the dimensions of unit volume per unit time. The flow rates for chemical injection systems used in connection with oil and gas wells in the domestic energy industry are often expressed in gallons per day (GPD). In certain embodiments, inputting the desired flow rate may be accomplished by an operator situated on an offshore production platform and the command may be transmitted to the controller on or near the subsea wellhead via an umbilical cable. The command may also be transmitted via a telemetry system from an onshore facility or another offshore unit.

In one particular preferred embodiment, system initialization includes driving the valve actuator to a mechanical limit by commanding a stepper motor driving the actuator to step a number of steps in one direction that exceeds the number of steps previously determined to correspond to full travel of the actuator. One or more reversals of the actuator followed by attempted "forward" travel in excess of the reverse travel may be used to ensure that the actuator is hard against the mechanical limit. Thus, although the initial position of the valve may be unknown upon system startup, an initialization routine can be used to move the valve to a known position. At block 105, the system may determine initial valve settings (number of steps) for both forward and reverse valve positions from the desired flow rate input at 100, a stored flow curve 115 and valve cracking position data 120—i.e., the number of steps from the valve closed position to the point at which the valve orifice begins to open in a certain direction. In one particular preferred embodiment, initialization includes moving the valve actuator from the mechanical limit position to a "center" closed position defined to be the midpoint between the "forward" valve cracking position and the "reverse" valve cracking position. By way of example, using the flow curve of FIG. 7, if the desired flow rate is 40 GPD and the forward valve cracking position is 33 steps from the "center" closed position, then the initial forward valve setting would be 171 steps from center (138+33). It has been found that the valve cracking position is valve-dependent and may vary from valve to valve and/or change following maintenance on the valve or valve actuator. The initial forward and reverse valve settings may be loaded in registers designated for that function.

Figure 7:
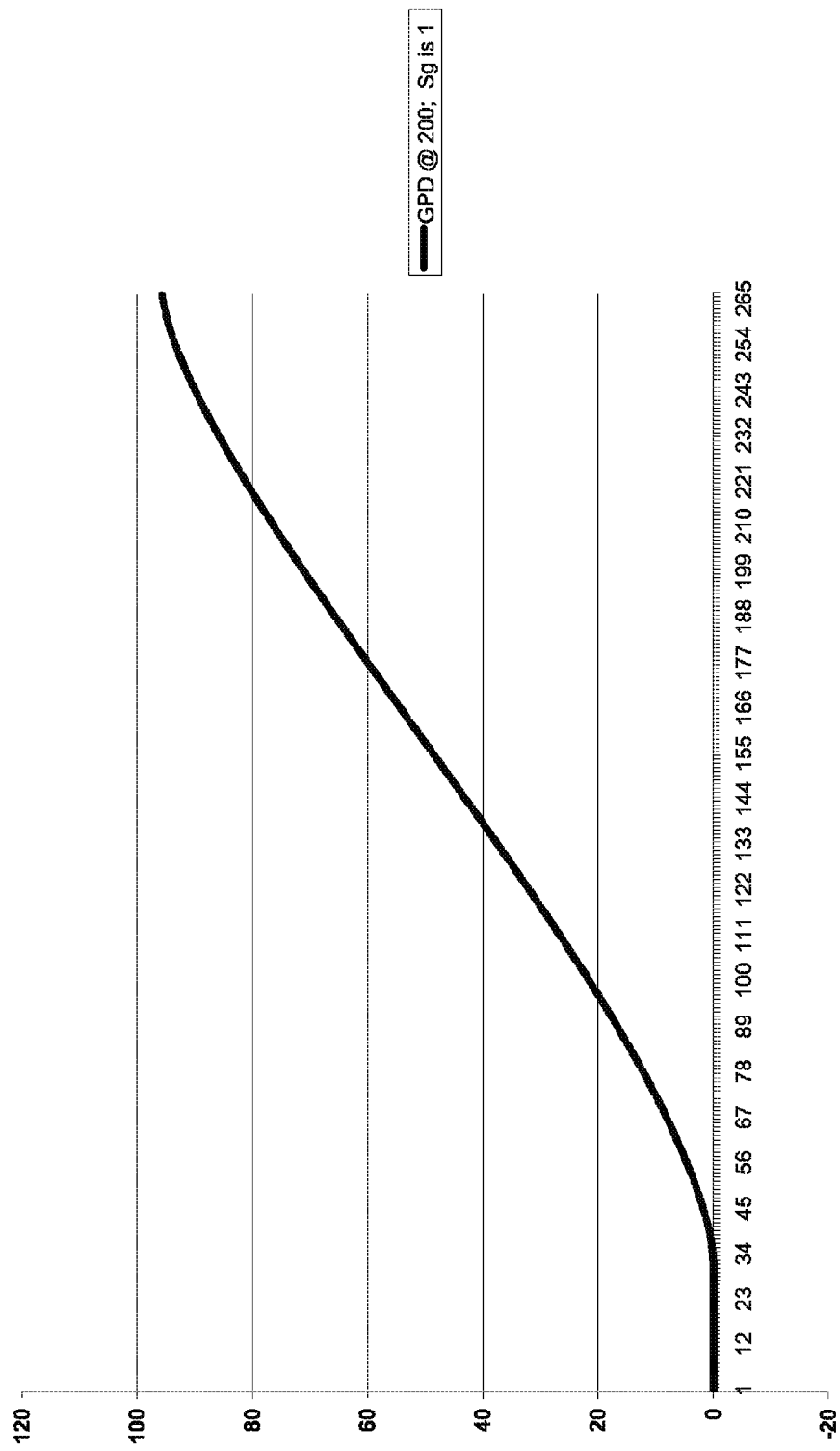
FIG. 7 is a graph of the flow produced by one particular representative control valve as a function of the number of steps made by a stepper motor driving the valve's actuator.

Flow curve data 115 may be in the form of a digitized flow curve such as the curve depicted in FIG. 7. In one particular preferred embodiment, flow data is tabulated for each step of a stepper motor-actuated valve. In other embodiments, the flow curve data may be in the form of a mathematical representation—e.g., slope and intercept values for a substantially linear flow curve. In the case of embodiments using digitized curves, the system may comprise means for interpolating between data points using conventional curve fitting techniques.

In certain embodiments (not shown), the initial system inputs may include the selection of a particular flow curve which may be associated with a particular chemical or chemical mixture to be injected or with a certain property of the fluid to be injected—for example, the specific gravity of the fluid, the viscosity of the fluid, the concentration of an active ingredient(s) in a solvent, or the like. In yet other embodiments, the initial input may include a correction factor which the system may use to modify a previously-stored, general-purpose flow curve for use with a specific chemical or chemical property—i.e., the stored flow curve may be for dilute aqueous solutions and a supplied correction factor allows the system to adapt the curve for a fluid having substantially different rheological properties. It will be appreciated, however, that a system according to the present invention will automatically compensate for fluids having different properties and tailoring the flow curve to a specific fluid provides an advantage only in the initial settings of the valve position and the first few computations of valve setting corrections.

Upon system startup, the position of free piston 22 within bore 20 may be unknown. Accordingly, upon initialization the system may configure the valve to drive the piston to a known location. At decision diamond 125 the system may first test for actuation of the forward limit switch (indicating that piston 22 is at the end of forward stroke travel). If switch actuation is detected, the process may proceed at block 130 to the reverse stroke sequence. If the forward limit switch is not actuated (N branch at diamond 125) the system proceeds at block 140 with a forward stroke sequence (see FIG. 6B).

Following system initialization, the normal flow process of alternating forward and reverse strokes may begin. A representative forward stroke sequence is illustrated in the flowchart of FIG. 6B and a corresponding reverse stroke sequence is depicted in FIG. 6C.

Figure 5:
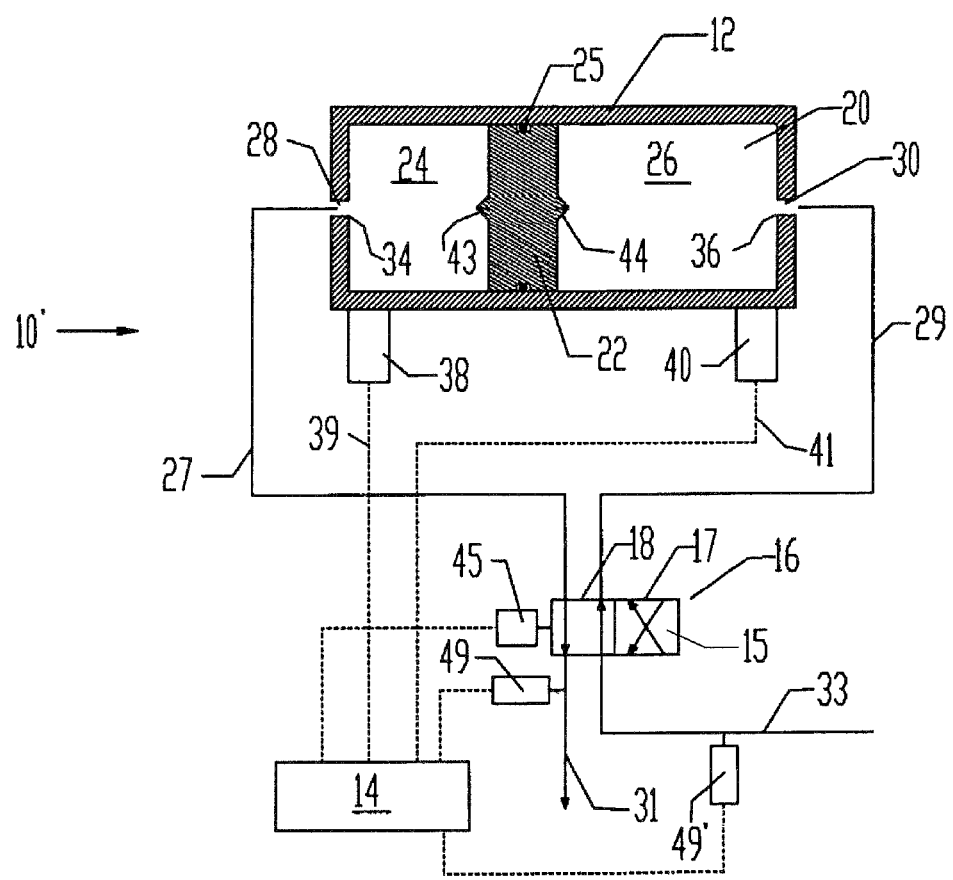
FIG. 5 is a schematic diagram of a chemical injection system modified for use with the present invention.
Figure 6B:
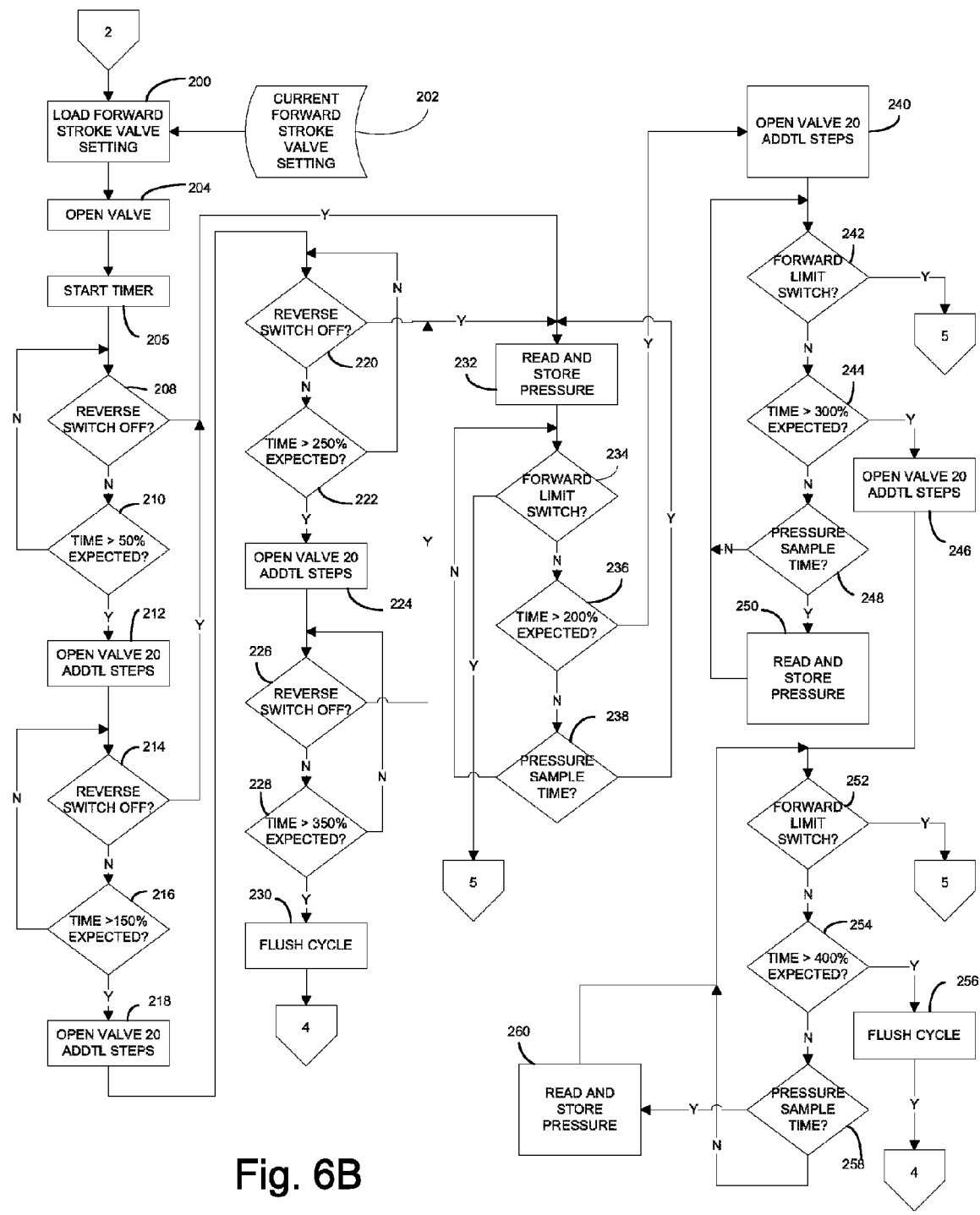
Figure 6C:
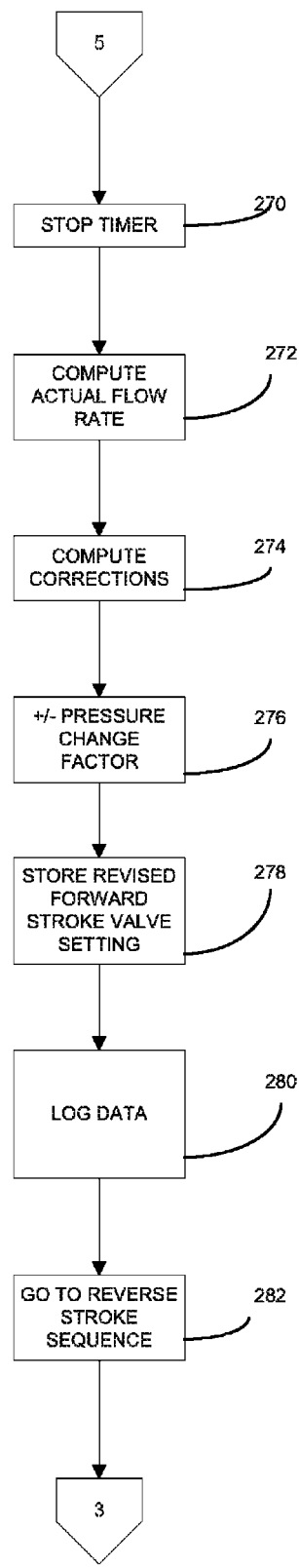

Referring now to FIG. 6B, the forward stroke sequence begins at block 200 with the current forward stroke valve setting (which may be in steps from the actuator limit, the center (closed) position, or from the most recent valve position) being loaded from register 202. At block 204, the control valve is driven by the stepper motor to the most current forward valve setting and a timer is started (block 205). In this condition, the system is now metering fluid through the control valve 16 from supply line 33 to chamber 26 via line 29. As fluid is pumped into chamber 26, piston 22 moves (to the left in FIG. 5) displacing fluid in chamber 24 which flows via line 27, valve 16 and line 31 to the injection point of the well. Fluid pressure in injection line 31 may be measured by pressure transducer 49 while that in supply line 33 is measured by pressure transducer 49'.

The program may include one or more routines that test for piston movement. For example, a forward stroke sequence (FIG. 6B) is usually entered from the completion of a reverse stroke sequence as signaled by actuation of the reverse limit switch 40. Movement of piston 22 away from the reverse stroke limit should deactivate reverse limit switch 40. This condition may be tested for at diamond 208. If the switch remains activated (i.e., the piston is still within the actuation range of the limit switch) the system may wait for a selected time interval before taking remedial action. In the illustrated embodiment, the system waits (at diamond 210) for an interval equal to 50% of the expected stroke time (cylinder displacement volume divided by selected flow rate) and if the reverse limit switch remains activated, the valve may be opened 20 additional steps (at block 212). In similar fashion, the system may now wait (at diamond 216) an additional time interval which, in the illustrated embodiment, is equal to the expected stroke time (now, cumulatively, 150% of the expected stroke time) for the reverse limit switch to deactivate (diamond 214). As before, if the piston does not move sufficiently to deactivate the reverse limit switch, the valve is opened an additional 20 steps (at block 218). In the illustrated embodiment, the progressive opening of the valve in the event of no piston movement may be repeated at diamonds 220 and 222 with additional valve opening at block 224. If the reverse limit switch remains activated (N branch at diamond 226) and the cumulative time since valve opening reaches 350% of the expected stroke time (Y branch at diamond 228), a flush cycle (as described more fully, below) may be initiated (at block 230). If, however, the reverse limit switch deactivates (Y branches of diamonds 208, 214, 220 or 226), the system proceeds to a normal forward stroke sequence block 232.

While fluid is flowing, the outputs of pressure transducers 49 and 49' may be periodically sampled and a differential pressure ($\Delta P$) stored by controller 14. In one particular preferred embodiment, a running average $\Delta P$ is stored by controller 14 along with the three most recent $\Delta P$ values in a FIFO stack. Additional filtering algorithms may be applied to eliminate or reduce the influence of pressure spikes which may be encountered during a stroke. This process may be implemented as shown in FIG. 6B at block 232 which subroutine is run at a pre-selected interval measured at diamond 238.

In the normal course of events, fluid flow continues until piston 22 reaches the end of its forward stroke (left wall of cavity 24 in FIG. 5) which activates limit switch 38 which activation is detected at diamond 234. As shown in FIG. 6C, the timer is stopped at block 270 and the accumulated time in the timer counter is the total time taken for piston 22 to move a full stroke. Since a full stroke displaces a known volume of fluid (as determined by the physical dimensions of cylinder 12 and piston 22), that volume divided by the accumulated time yields the average flow rate of fluid during that particular forward stroke. At block 272, the measured average flow rate for the stroke is compared to the desired flow rate which was input by the operator at 100.

Corrections (if any) to the forward stroke valve setting are computed at block 274. In one particular preferred embodiment, the difference between the measured flow rate and the desired flow rate is equated to a certain number of steps from the flow curve stored at 115. The correction may be taken directly from the curve or computed from the first derivative of the curve. As discussed above, in certain embodiments, the system may interpolate between data points in order to determine the correction.

As shown at block 276, the valve setting correction may further be refined by a factor relating to a change in the average $\Delta P$ from the previous forward stroke. In certain embodiments, the $\Delta P$ correction factor may be a function (in whole or in part) of selected $\Delta P$ values, e.g., the three most recent $\Delta P$ values stored in the FIFO stack of the illustrated embodiment. Especially at relatively slow flow rates, a change in $\Delta P$ immediately prior to the end of the stroke may be more indicative of the $\Delta P$ likely to be encountered during the next forward stroke.

The $\Delta P$ correction may be derived from empirically determined values of flow rate at various differential pressures. In other embodiments, the $\Delta P$ correction may be calculated from a function which relates flow (or steps of the valve actuator motor 45) to $\Delta P$.

It should be appreciated that the process of the present invention will function without $\Delta P$ data—i.e., the absence or failure of a pressure sensor 49 will not disable the system. The corrections computed at block 274 will compensate for changes in $\Delta P$. The use of $\Delta P$ information (at block 276) enables the system to make better predictions of the valve setting needed to produce the desired flow rate. However, the iterative process will "zero in" on the correct setting even without this data.

Figure 6D:
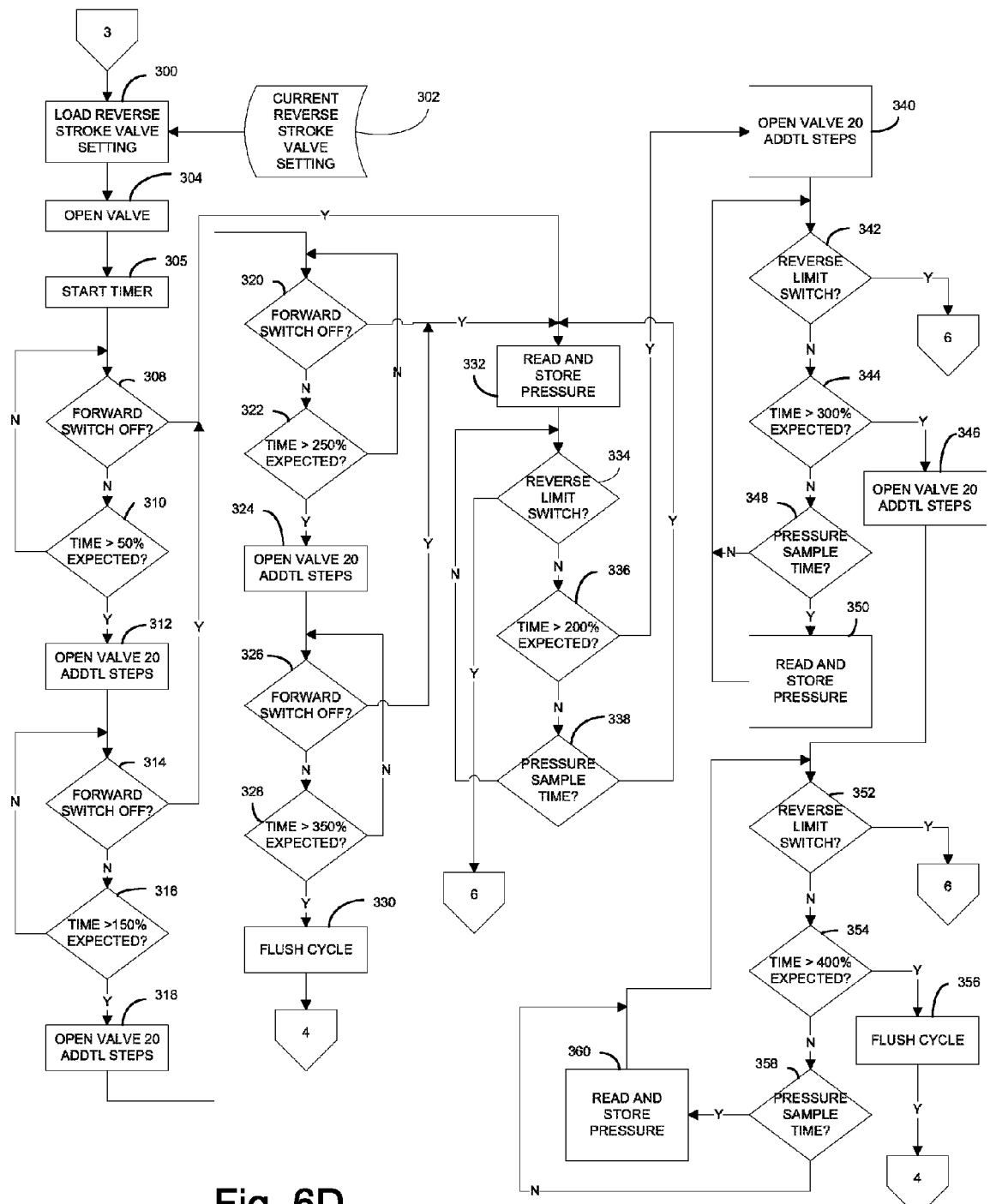
Figure 6E:
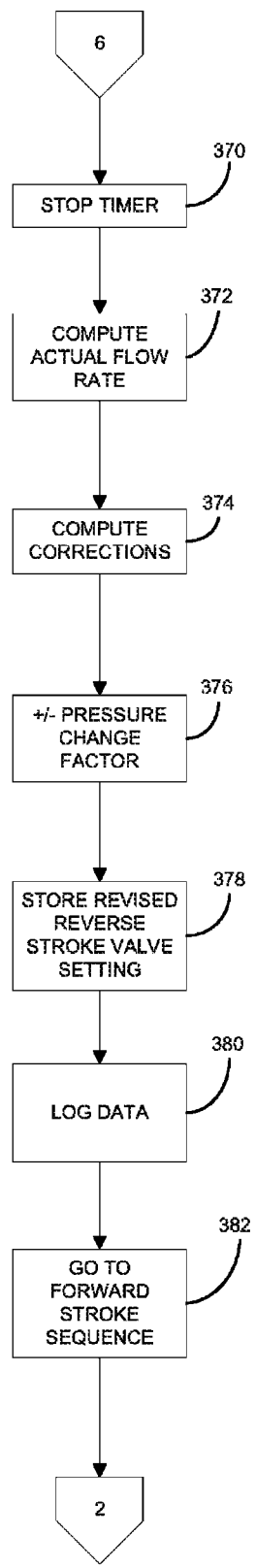

At block 278, the revised valve setting to be used on the next forward stroke is stored in the register (or other storage device) designated for that purpose and the process proceeds to the reverse stroke sequence, as shown at block 282 (and in FIGS. 6D and 6E). Optionally, at block 280, data concerning the just-completed stroke sequence may be logged before proceeding to the reverse stroke sequence. Examples of log data include actual stroke time, the time and number of additional valve openings (e.g., blocks 212, 218, 224, 240 and/or 246) and whether a flush cycle (blocks 230 or 256) was required. Any other parameters sensed by the system may also be recorded at this step in the process.

Since the full travel of free piston 22 displaces a known volume of fluid, the time which should be required for a full stroke of piston 22 at the desired flow rate may be calculated to produce an expected stroke time. As shown at block 236, the elapsed stroke time may be compared to the expected stroke time and, if the elapsed stroke time exceeds the expected stroke time by a selected margin (100% in the illustrated example), the system may initiate corrective action—progressive opening of the valve in 20-step increments at 200% of the expected stroke time (diamond 236) and again at 300% of the expected stroke time (diamond 244). If the time exceeds 400% of the expected stroke time (Y branch at diamond 254), a flush cycle (block 256) is initiated in the illustrated embodiment. In each of these routines, $\Delta P$ readings may be taken and stored (blocks 250 and 260) at a selected, repetitive time interval (diamonds 248 and 258).

The control of a "reverse" stroke cycle—i.e., a stroke wherein the control valve is positioned such that flow path 15 is active and fluid flows into chamber 24 via line 27 and is expelled from chamber 26 and into line 29 as piston 22 moves from left to right in FIG. 5—is illustrated in FIGS. 6D and 6E. The process is analogous to that illustrated for a "forward" stroke in FIGS. 6B and 6C and discussed above. Reference numbers for corresponding elements in FIGS. 6B and 6C differ by a value of 100 from those in FIGS. 6D and 6E. The current reverse stroke valve setting may be stored in register 302 and loaded into the controller at block 300. Corrections computed for the reverse valve setting at block 374 and (optionally) block 376 may be stored in register 305 at block 378 and used for the next reverse stroke. At the completion of a "reverse" stroke, the process returns to the forward stroke sequence (at block 382). In this way, the system continuously iterates forward and reverse valve settings to provide the requested fluid flow rate.

Figure 6F:
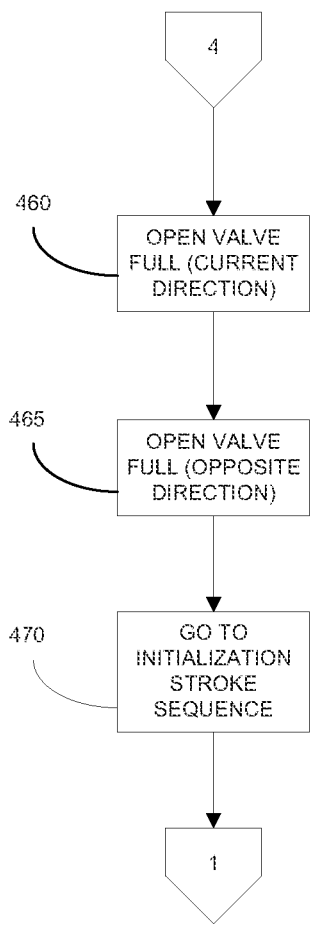

As shown at blocks 230 and 256 (FIG. 6B) and blocks 330 and 356 (FIG. 6D), the system may initiate a flush cycle in the event that the elapsed stroke time exceeds the expected stroke time by a selected margin. One possible cause of less-than-expected fluid flow rate is debris obstructing or partially obstructing an orifice in control valve 16. The system may act to flush debris from the control valve (or an associated fluid conduit). A flush cycle according to one preferred embodiment of the invention is illustrated in the flowchart of FIG. 6F. In this cycle, the control valve is first driven to its full open position in one direction (block 460) and then to its full open position in the opposite direction (block 465). It has been found in practice that this cycle is almost always successful in flushing obstructive debris from the chemical injection system. Following a flush cycle, the system may perform an initialization sequence (block 470).

Figure 8:
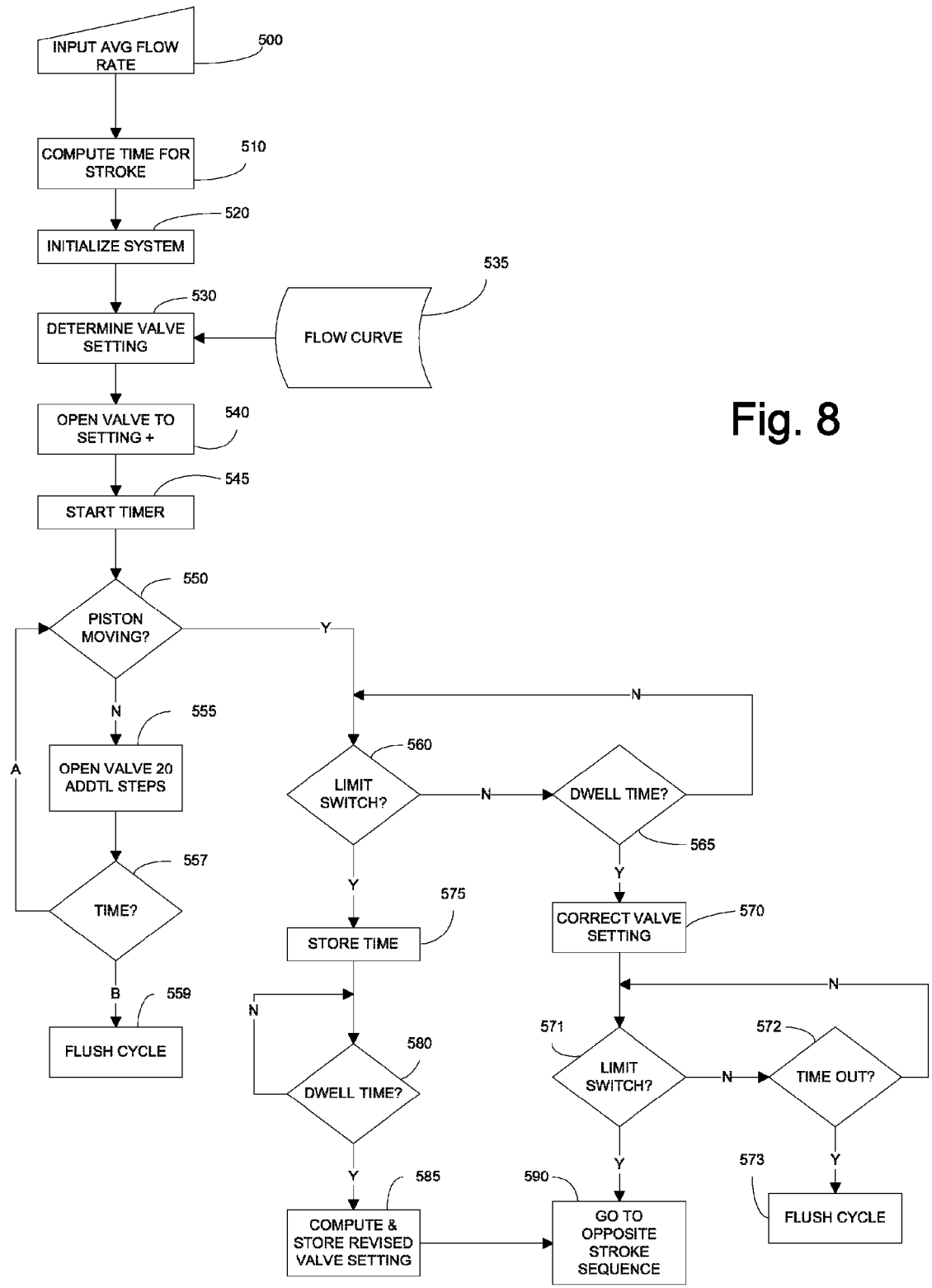
FIG. 8 is a flowchart depicting the steps of a method according to a second embodiment of the invention.

FIG. 8 is a flowchart that illustrates an alternative embodiment of the invention wherein a fixed, known volume of chemical is injected in a predetermined time interval. This embodiment has particular advantage in those applications where controlling the total volume of chemical injected in a certain period of time is more important than injecting the chemical at a constant rate.

The process may begin at manual input 500 with the operator's selection of an average flow rate. Since a full stroke of piston 22 displaces a known volume of chemical, at block 510 the system may compute the time required to displace the volume of chemical injected during a full stroke at the selected flow rate. At block 520, the system may be initialized as described previously in order to position piston 22 at the beginning of a stroke. Using the stored flow curve, the valve setting which should produce the selected flow rate is determined at block 530 from the flow curve stored at 535. At block 540, the valve is opened to provide a somewhat larger orifice than that required to achieve the selected flow rate. The absolute value of the overage may be a selected percentage increase in the selected flow rate (e.g., X+10% GPD), a selected incremental increase in flow rate (e.g., X+5 GPD) or a pre-selected number of additional steps of the stepper motor which positions the valve (e.g., computed position from the flow curve+15 steps).

A timer may be started at block 545 and the system may then test for piston movement (at diamond 550) by sensing deactivation of the previously activated limit switch. If piston movement is not detected (N branch at 550) in the illustrated embodiment, the valve is opened an additional 20 steps. This process may be repeated (A branch at diamond 557) at selected time intervals and, if no piston movement is detected after a selected cumulative time (B branch at 557) a flush cycle may be initiated at block 559 to clear any obstruction in the valve orifice.

Once piston movement has been detected (Y branch at 550), the system may wait (at 560) for the limit switch to signal that the piston has reached the end of a stroke and the known volume of a full stroke has been injected into the well. The valve position set at 540 should result in a full stroke being completed before the time interval computed at 510 has elapsed—i.e., the system should need to wait for a "dwell time" to elapse before initiating another stroke. At diamond 565, the system tests for the end of the computed time interval before actuation of the limit switch. If true (Y branch at 565), an error condition exists (block 570) and the system may take remedial action by correcting the valve setting used at block 530. If the limit switch is still not activated after a selected interval (diamond 572), the remedial action may include a flush cycle (block 573), as described previously in connection with FIG. 6F, and/or an upward adjustment of the store valve position.

However, in the normal course of events, the piston will reach the end of a stroke (thereby actuating the limit switch) prior to the end of the time interval computed at 510 (Y branch at 560). The system may store the time of limit switch actuation at 575 and then wait (at 580) for the end of the time period at diamond 580.

The time taken by the piston to make a full stroke (recorded at 575) may be used to compute and store a revised valve setting at block 585. This revised setting may then be used by the system for the next stroke in the same direction. In this way, the system continuously refines the valve setting to compensate for any changes in parameters which may effect flow rate—e.g., supply pressure, viscosity, density, etc.

At block 590, the system sequences to a corresponding process for a stroke in the opposite direction (which may begin at block 530) and the system alternates between "forward" and "reverse" strokes while iterating the required valve settings.

Although the invention has been described in detail with reference to certain preferred embodiments, variations and modifications exist within the scope and spirit of the invention as described and defined in the following claims.

What is claimed is:

1. A method for injecting a liquid phase chemical into a well comprising:
    storing a predetermined curve of fluid flow rate versus variable orifice actuator position;
    inputting a certain desired fluid flow rate;
    opening a variable orifice to an initial position previously determined to provide the desired flow rate;
    dispensing a known volume of liquid phase fluid by passing a liquid phase fluid through the variable orifice;
    timing the period required to dispense the known volume of fluid;
    computing the average fluid flow rate during the timed period;
    comparing the computed average fluid flow rate to the desired flow rate; and,
    adjusting the size of the variable orifice to minimize the difference between the computed flow rate and the desired flow rate.

2. A method as recited in claim 1 wherein the known volume of fluid is dispensed by moving a barrier in a fluid container a known distance.

3. A method as recited in claim 2 wherein the fluid container comprises a cylinder and the fluid barrier comprises a free piston in the cylinder.

4. A method as recited in claim 2 wherein the barrier divides the container into a first compartment and a second compartment and moving the barrier comprises displacing the barrier by pumping fluid into the first compartment.

5. A method as recited in claim 1 wherein opening a variable orifice to dispense a known volume of fluid comprises selecting an orifice actuator position related to orifice size from the stored curve.

6. A method as recited in claim 1 wherein opening a variable orifice to an initial position comprises interpolating between points on the stored curve.

7. A method as recited in claim 5 wherein adjusting the size of the variable orifice comprises using the stored curve to select an orifice actuator position that corresponds to the difference between the computed average flow rate and the desired flow rate.

8. A method as recited in claim 1 further comprising storing a function that equates fluid flow rate to a value related to orifice size.

9. A method as recited in claim 8 wherein opening a variable orifice to dispense a known volume of fluid comprises selecting a value related to orifice size using the stored function.

10. A method as recited in claim 8 wherein adjusting the size of the variable orifice comprises using the stored function to select a value related to orifice size that corresponds to the difference between the computed average flow rate [and?] the desired flow rate.

11. A method as recited in claim 1 further comprising
    computing an expected value of the time period required to dispense the known volume of fluid and
    opening the variable orifice fully if the time elapsed from the initial opening of the orifice exceeds the expected value by a pre-selected margin.

12. A method for injecting a liquid phase chemical into a well comprising:
    inputting a certain desired fluid flow rate;
    selecting an initial variable orifice actuator position previously determined to provide the desired flow rate from data correlating orifice actuator position to flow rate;
    moving a variable orifice actuator to the selected position to dispense a known volume of fluid by moving a barrier in a fluid container a known distance;
    sensing movement of the barrier;
    moving the variable orifice actuator an additional amount if barrier movement is not sensed within a pre-selected time interval that is a function of the inputted desired fluid flow rate;
    timing the period required to dispense the known volume of fluid;
    computing the average fluid flow rate during the timed period;
    comparing the computed average fluid flow rate to the desired flow rate; and,
    adjusting the position of the variable orifice actuator to minimize the difference between the computed flow rate and the desired flow rate.

13. A method as recited in claim 12 wherein the fluid container comprises a cylinder and the fluid barrier comprises a free piston in the cylinder.

14. A method as recited in claim 12 wherein the barrier divides the container into a first compartment and a second compartment and moving the barrier comprises displacing the barrier by pumping fluid into the first compartment.

15. A method for injecting a liquid phase chemical into a well comprising:

inputting a certain desired fluid flow rate;

opening a variable orifice to an initial position previously determined to provide the desired flow rate;

dispensing a known volume of liquid phase fluid by passing a liquid phase fluid through the variable orifice;

computing an expected value of the time period required to dispense the known volume of fluid and increasing the size of the variable orifice if the time elapsed from the opening of the orifice exceeds the expected value by a pre-selected margin;

timing the period required to dispense the known volume of fluid;

computing the average fluid flow rate during the timed period;

comparing the computed average fluid flow rate to the desired flow rate; and, adjusting the size of the variable orifice to minimize the difference between the computed flow rate and the desired flow rate.

16. A method for injecting a liquid phase chemical into a well comprising:

inputting a certain desired fluid flow rate;

opening a variable orifice to an initial position previously determined to provide the desired flow rate;

dispensing a known volume of liquid phase fluid by passing a liquid phase fluid through the variable orifice;

timing the period required to dispense the known volume of fluid;

computing the average fluid flow rate during the timed period;

comparing the computed average fluid flow rate to the desired flow rate;

adjusting the size of the variable orifice to minimize the difference between the computed flow rate and the desired flow rate.

computing an expected value of the time period required to dispense the known volume of fluid;

increasing the size of the variable orifice if the time elapsed from the opening of the orifice exceeds the expected value by a first pre-selected margin; and, opening the variable orifice fully if the time elapsed from the initial opening of the orifice exceeds the expected value by a second pre-selected margin.

17. The method recited in claim 16 wherein the orifice is a variable valve having a first position which allows fluid flow in a first direction and a second position which allows fluid flow in a second direction and opening the variable orifice fully comprises sequentially opening the valve fully in the first direction and opening the valve fully in the second direction.

* * * * *